(12) United States Patent
Bragg et al.

(10) Patent No.: US 8,990,418 B1
(45) Date of Patent: Mar. 24, 2015

(54) PROVIDING DATA FEEDS FOR VIDEO PROGRAMS

(75) Inventors: Richard William Bragg, Los Altos, CA (US); Justin Koh, Mountain View, CA (US); Katherine Grace McGrath, Mountain View, CA (US); Pierre-Yves Laligand, Mountain View, CA (US)

(73) Assignee: Google Inc., Mountain View, CA (US)

( * ) Notice: Subject to any disclaimer, the term of this patent is extended or adjusted under 35 U.S.C. 154(b) by 270 days.

(21) Appl. No.: 13/486,975

(22) Filed: Jun. 1, 2012

(51) Int. Cl.
*G06F 15/173* (2006.01)
*H04L 29/06* (2006.01)

(52) U.S. Cl.
CPC .............................. *H04L 29/06476* (2013.01)
USPC ........... 709/231; 709/203; 709/217; 709/219; 725/46; 725/53

(58) Field of Classification Search
USPC ................. 709/203, 217, 219, 223, 230, 231; 725/46, 53, 110, 35, 105
See application file for complete search history.

(56) References Cited

U.S. PATENT DOCUMENTS

| | | | |
|---|---|---|---|
| 7,519,724 B2 * | 4/2009 | Venkatsubra et al. | 709/231 |
| 8,533,761 B1 * | 9/2013 | Sahami et al. | 725/53 |
| 8,578,274 B2 * | 11/2013 | Druzgalski et al. | 715/234 |
| 8,583,759 B2 * | 11/2013 | Harrison et al. | 709/217 |
| 2005/0028206 A1 * | 2/2005 | Cameron et al. | 725/110 |
| 2007/0162939 A1 * | 7/2007 | Bennett et al. | 725/74 |
| 2007/0162945 A1 * | 7/2007 | Mills | 725/119 |
| 2008/0172615 A1 * | 7/2008 | Igelman et al. | 715/719 |
| 2009/0031382 A1 * | 1/2009 | Cope | 725/115 |
| 2009/0172752 A1 * | 7/2009 | Lopatic | 725/87 |
| 2010/0023862 A1 * | 1/2010 | Tai et al. | 715/721 |
| 2010/0037251 A1 * | 2/2010 | Lindhult | 725/31 |
| 2010/0100537 A1 * | 4/2010 | Druzgalski et al. | 709/202 |
| 2012/0144427 A1 * | 6/2012 | Lee et al. | 725/51 |
| 2012/0210351 A1 * | 8/2012 | Nukala et al. | 725/35 |
| 2012/0246691 A1 * | 9/2012 | Grewal | 725/110 |
| 2013/0036201 A1 * | 2/2013 | McLaughlin | 709/219 |
| 2014/0259037 A1 * | 9/2014 | Belyaev et al. | 725/14 |

OTHER PUBLICATIONS

Reddit Video http://web.archive.org/web/20110222221351/http://www.reddit.com//r//videos// Feb. 22, 2011, 3 pgs.
Reddit Widget, http://web.archive.org/web/20111209041750/http://www.reddit.com/r/videos/widget, Dec. 9, 2011, 2 pgs.

(Continued)

*Primary Examiner* — Ramy M Osman
(74) *Attorney, Agent, or Firm* — Morgan, Lewis & Bockius LLP

(57) ABSTRACT

A system, computer-readable storage medium storing at least one program, and a computer-implemented method for providing data feeds for video programs is presented. A request is received from a client device of a user to obtain a data feed for a set of video programs in a plurality of video programs, where the set of video programs includes video programs having at least one common attribute. In response to receiving the request, a data feed for the set of video programs is generated using metadata for the plurality of video programs and a profile for the user, where a respective data item in the data feed corresponds to a respective video program in the set of video programs and includes at least one link to at least one content source from which the respective video program is available. The data feed is then provided to the client device.

23 Claims, 9 Drawing Sheets

(56) References Cited

OTHER PUBLICATIONS

Newsy About, http://web.arehive.org/web/20101222005547/http://www.newsy.com/about/ Dec. 22, 2010, 1 pg.

Newsy/RSS Sitemap/Multisource Video News Analysis, http://web.archive.org/web/20101221105803/http://www.newsy.com/rss/sitemap/ Dec. 21, 2010, 1 pg.

* cited by examiner

US 8,990,418 B1

PROVIDING DATA FEEDS FOR VIDEO PROGRAMS

TECHNICAL FIELD

The disclosed implementations relate generally to providing data feeds for video programs.

BACKGROUND

Video programs may be accessible to viewers from a plurality of content sources. For example, a particular video program may be accessible to viewers through over-the-air television services, cable television services, satellite television services, Internet Protocol Television (IPTV) services, and/or Internet video streaming services. Viewers typically desire to know when and where a video program may be accessed. However, there is currently no mechanism to provide viewers with information relating to video programs across a plurality of content sources.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

The implementations described herein provide techniques for providing data feeds for video programs.

Figure 1:
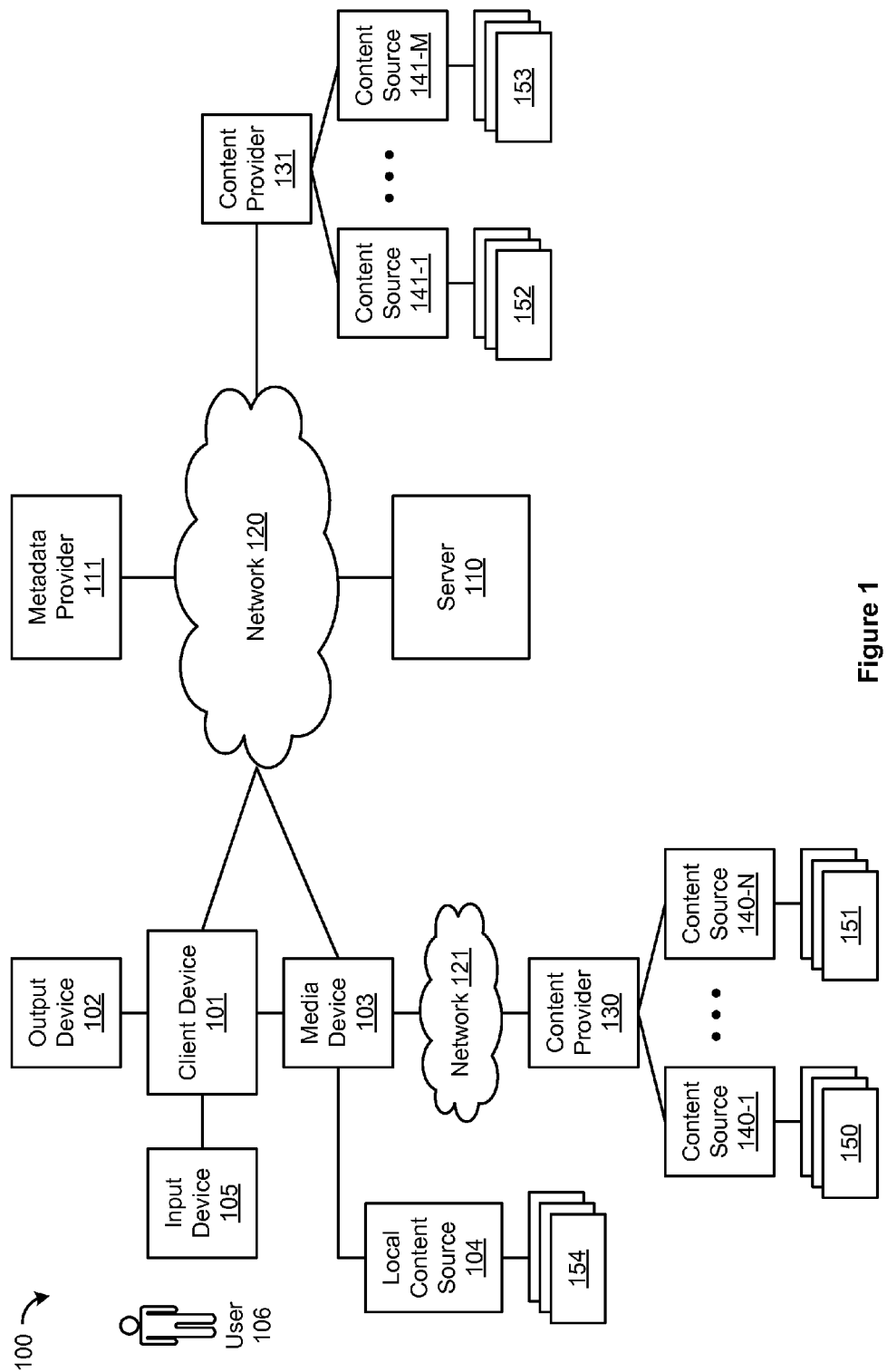
FIG. 1 is a block diagram illustrating a network system, according to some implementations.

FIG. 1 is a block diagram illustrating an example network system 100, according to some implementations. The network system 100 includes a client device 101 coupled to an output device 102, a media device 103, and an input device 105 of a user 106. In some implementations, the client device 101 is a television set top box. In some implementations, the output device 102 includes one or more of a monitor, a projector, a television, and a speaker.

In some implementations, the client device 101 is an intermediary device that is configured to control devices coupled to the client device 101 (e.g., the media device 103, the output device 102, etc.) and that is configured to provide enhanced multimedia functionality. The enhanced multimedia functionality includes, but is not limited to, providing picture-in-picture capabilities on the output device 102 that allows the user 106 to simultaneously access (e.g., browse and/or otherwise interact with) web sites on the output device 102 (e.g., a television display) while watching and/or listening to an instance of a media item (e.g., a video program) being presented in a smaller area of the output device 102, providing a user interface on the output device 102 that allows the user 106 to search for instances of media items that are available on content sources (e.g., a particular television channel, a streaming media service, etc.) that are accessible to the client device 101 of the user 106, and modifying audio and/or video signals received from the media device 103 (e.g., overlaying graphical objects in video stream, inserting audio into an audio stream, etc.) and outputting the modified audio and/or video signals to the output device 102 for presentation to the user 106.

Note that an "instance of a media item" may refer to a particular showing of the media item at a particular date and/or time on a particular content source (e.g., a showing of Episode 1 of the Simpsons at 10 PM on Jan. 3, 2011, on Channel 2 of an over-the-air television service, etc.) or a particular copy of the media item on a particular content source (e.g., Episode 1 of the Simpsons on streaming video service 1 for rent, Episode 1 of the Simpsons on streaming video service 2 for purchase, etc.).

A media item includes, but is not limited to, a video program (e.g., a movie, a video, a television program, etc.), a book, an issue of a magazine, an article, a song, and a game.

A content source includes, but is not limited to, a digital video recorder, a satellite radio channel, an over-the-air radio channel, an over-the-air television channel, a satellite television channel, a cable television channel, a cable music channel, an Internet Protocol television channel, and a streaming media service (e.g., a video-on-demand service, a streaming video service, a streaming music service, etc.).

In some implementations, the user 106 uses the input device 105 to instruct the client device 101 to perform various actions with respect to the output device 102 and/or the media device 103. For example, the user 106 may use the input device 105 to instruct the client device 101 to increase the volume of the output device 102. Similarly, the user 106 may use the input device 105 to instruct the client device 101 to instruct the media device 103 to obtain instances of media items. Furthermore, the user 106 may use the input device 105 to instruct the client device 101 to search for instances of media items satisfying a search query.

The input device 105 includes, but is not limited to, a pointing device (e.g., a mouse, a trackpad, a touchpad, a free space pointing device), a keyboard, a touch-sensitive display device (e.g., a touch-screen display and/or controller), a remote controller, a smart phone including a remote controller application, and a visual gesture recognition system (e.g., a system that captures and recognizes motions and/or gestures of a user and translates the motions and/or gestures into input commands).

In some implementations, the media device 103 is configured to obtain instances of media items from a content source and provide audio and/or video signals to be presented to the user 106 using the output device 102.

In some implementations, the media device 103 obtains instances of media items (e.g., instances of media items 154) from a local content source 104. In some implementations, the local content source 104 includes one or more of a digital video recorder of the media device 103, a hard disk drive of the media device 103, or a network storage device accessible by the media device 103.

In some implementations, the media device 103 obtains instances of media items (e.g., instances of media items 150 and 151) from content sources 140 provided by a content provider 130 via network 121. A "content provider" is an entity or a service that provides one or more content sources and a "content source" is a source of instances of media items (e.g., a television channel, a radio channel, a web site, a streaming media service, etc.). In some implementations, network 121 includes one or more of a cable television service, a satellite television service, a satellite radio service, an over-the-air television service, an over-the-air radio service, or a data network (e.g., network 120, the Internet, a virtual private network, etc.).

In some implementations, the media device 103 obtains instances of media items (e.g., instances of media items 152 and 153) from content sources 141 provided by a content provider 131 via network 120. In some implementations, the content provider 131 is a streaming media service (e.g., a streaming video service, a streaming audio service, etc.). Network 120 can generally include any type of wired or wireless communication channel capable of coupling together computing nodes. This includes, but is not limited to, a local area network, a wide area network, and a combination of networks. In some implementations, network 120 includes the Internet.

In general, the media device 103 may obtain instances of media items from any combination of: local content sources, content sources available via network 121, and content sources available via network 120.

In some implementations, the media device 103 includes a physical device. The physical device includes, but is not limited to, a digital video recorder, a satellite radio set top box, an over-the-air radio tuner, an over-the-air television tuner, a satellite television set top box, a cable television set top box, an Internet Protocol television set top box, and a game console.

In some implementations, the media device 103 includes a virtual device (e.g., a software module) executing on the client device 101. The virtual device includes, but is not limited to, a web browser executing on the client device 101 and a streaming media application executing on the client device 101.

In general, the media device 103 may include any combination of physical devices and virtual devices.

In some implementations, the network system 100 includes a server 110 coupled to network 120. In these implementations, the server 110 obtains metadata for instances of media items from a metadata provider 111 and/or from web sites on the Internet, builds a database of media items based on the metadata for the instances of the media items, and returns information relating to instances of media items satisfying search queries and that are available on content sources accessible to the client device 101. A content source that is accessible to the client device 101 (of a user 106) includes a content source for which the client device 101 has a subscription (e.g., a cable or satellite television channel, a streaming media service, etc.) a content source for which the client device 101 has an appropriate media device to receive media items from the content source (e.g., an over-the-air television or radio tuner, a network interface device, an application for a streaming media service, etc.), and a content source for which the client device 101 has purchased rights to obtain media items (e.g., a video-on-demand service, a video rental service, etc.). Note that the client device 101 may only be able to access a particular set of content sources. For example, the client device 101 may only have access to particular channels on a cable television service. Similarly, the client device 101 may have access to a first streaming media service, but not a second streaming media service. Thus, it is beneficial to provide the user 106 only with information for instances of media items that are available on content sources accessible to the client device 101.

The metadata for an instance of a media item include, but are not limited to, a content source on which the instance of the media item is available, dates and times when the instance of the media item is available, a description of the item, i.e., a title, actors associated with the instance of the media item, musicians associated with the instance of the media item, producers associated with the instance of the media item, directors associated with the instance of the media item, a synopsis of the instance of the media item, a first air date of the instance of the media item, a series for which the instance of the media item is a member (e.g., a television series, etc.), a genre (e.g., comedy, drama, game show, horror, suspense, reality, etc.) of the instance of the media item, and a cost of the instance of the media item.

The information relating to an instance of the media item include, but are not limited to, at least a subset of the metadata for the instance of the media item, links to content relating to the media item (e.g., a link to an a web page of an actor appearing in the media item, etc.), and content relating to the media item that is obtained from another database (e.g., a proprietary database) and/or from web pages including content related to the media item (e.g., a web page for a television program, a web page for an actor, etc.).

In some implementations, previous search queries and search results are stored in a cache to speed up query responses. The previous search queries and search results may be periodically removed from the cache to ensure that the cache is not storing search results for instances of media items that are no longer available (e.g., a show time of an episode of a television series may have passed since information relating to the instance of the episode was stored in the cache).

Note that although FIG. 1 illustrates that the client device 101 is coupled to one media device (e.g., the media device 103), one output device (e.g., the output device 102), and one input device (e.g., the input device 105), the client device 101 may be coupled to multiple media devices, multiple output devices, and multiple input devices. Similarly, although FIG. 1 illustrates one client device (e.g., the client device 101) and one metadata provider (e.g., metadata provider 111), the network system 100 may include multiple client devices and metadata providers. Moreover, although FIG. 1 illustrates one content provider (e.g., the content provider 130) coupled to network 121 and one content provider (e.g., the content provider 131) coupled to network 120, multiple content providers may be coupled to each network.

Furthermore, although FIG. 1 shows one instance of the server 110, multiple servers may be present in the network system 100. For example, the server 110 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.).

Note that the discussion below refers to video programs. However, it should be understood that the discussion below may be applied to any media item.

Figure 2:
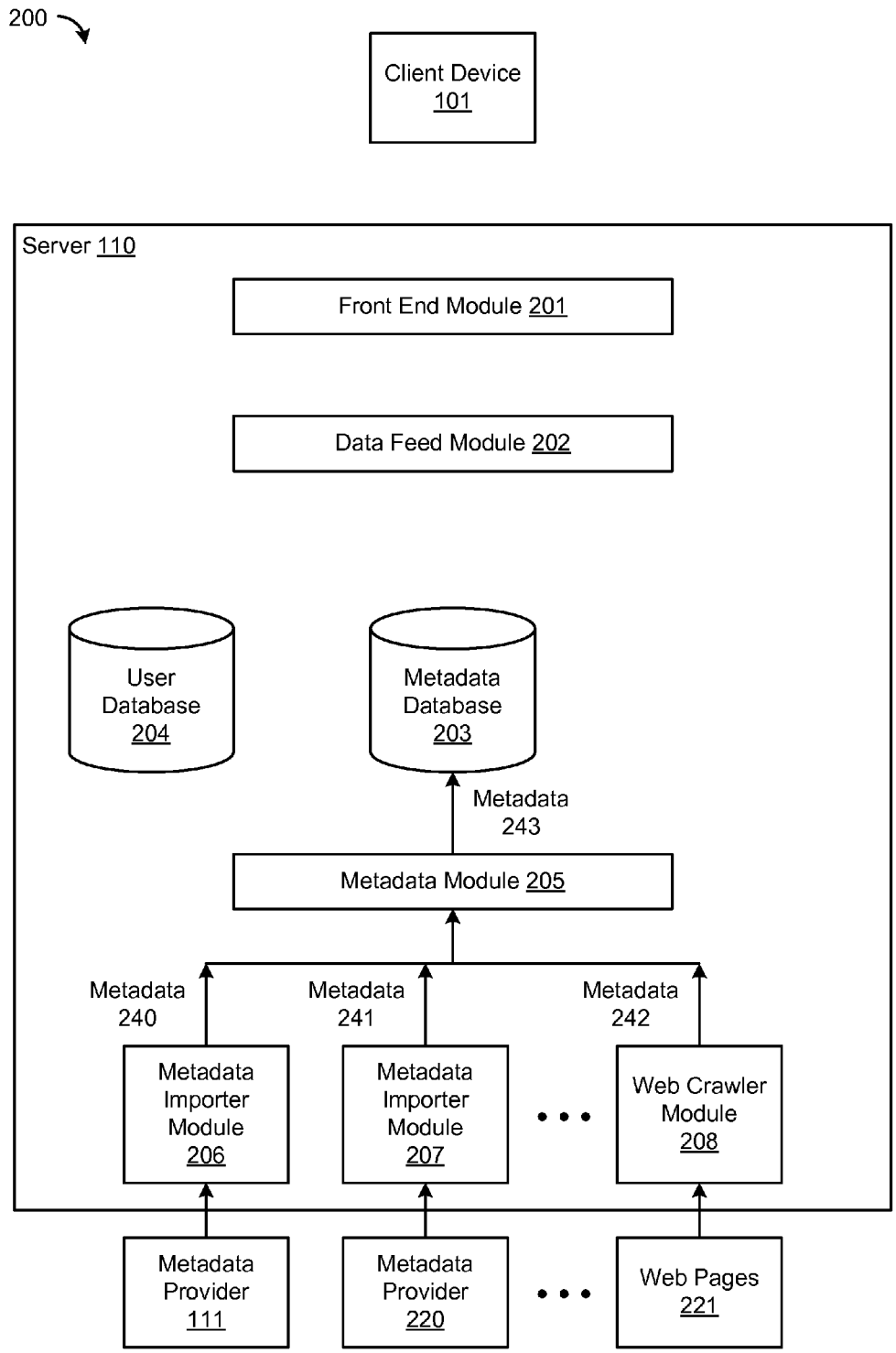
FIG. 2 is a block diagram illustrating a process for obtaining metadata for video programs, according to some implementations.

FIG. 2 is a block diagram 200 illustrating a process for obtaining metadata for video programs, according to some implementations. The server 110 includes a front end module 201, a data feed module 202, a metadata database 203, user database 204, a metadata module 205, metadata importer modules 206-207, and a web crawler module 208. The front end module 201 provides an interface between the modules of server 110 and the client device 101 (and/or other computer systems). The metadata database 203 includes metadata for unique instances of video programs, as described below. The user database 204 includes profiles for users, as described below. Note that the user database 204 only includes information for users who have opted into allowing the server 110 to store their information in the user database 204 and/or who have opted into allowing the server 110 to use their information as described herein. The implementations described herein use the information for the users who have opted into allowing the server 110 to store and/or use their information for the user's benefit (e.g., to provide enhanced services) and is not shared with non-user controlled systems (e.g., systems that the user has not opted into allowing use of their information). The data feed module 202 is described in more detail below with reference to FIGS. 3 and 7-12. The metadata module 205, the metadata importer modules 206-207, and the web crawler module 208 are described in more detail below.

The following discussion illustrates an example process for importing metadata for instances of video programs. The metadata importer modules 206-207 obtain metadata 240 and 241 for instances of video programs from metadata providers 111 and 220, respectively. In some implementations, the server 110 includes a metadata importer module for each metadata provider. The web crawler module 208 imports and processes web pages 221 to produce metadata 242 for instances of video programs. The metadata 240, 241 and 242 may include duplicate information. For example, the metadata provider 111 and the metadata provider 220 may both provide metadata for instances of video programs available from a particular cable television service. However, each metadata provider may use a different data format for the metadata for the instances of the video programs available from the particular cable television service. Thus, in some implementations, the metadata module 205 normalizes the metadata 240, 241, and 242 for the instances of the video programs into a predetermined data format. Furthermore, each metadata provider may use different identifiers for the instances of the video programs available from the particular cable television service. Stated another way, each metadata provider may use different identifiers for a particular video program on the particular cable television service. Thus, in some implementations, the metadata module 205 analyzes the metadata 240, 241, and 242 for the instances of the video programs to identify unique instances of video programs (e.g., a particular showing of a video program on a particular channel of a cable television service). For example, the metadata module 205 may identify unique instances of video programs by grouping instances of video programs for which a predetermined subset of the metadata for the instances of the video programs match (e.g., a group of instances of video programs is formed when the series name, the episode number, and the actors match for each of the instances of the video programs in the group, a release year, etc.). In some implementations, a group of instances of video programs is formed when the series name, the episode number, and the actors match for each of the instances of the video programs in the group. In some implementations, a group of instances of video programs is formed when the movie name, release year, and the actors match for each of the instance of the video programs in the group. After a unique instance of a particular video program is identified, the metadata module 205 merges the metadata for the unique instance of the particular video program received from the metadata providers (e.g., the metadata provider 111, the metadata provider 220, web pages 221, etc.). The output of the metadata module 205 includes metadata 243, which includes normalized and/or merged metadata for unique instances of video programs. The metadata data module 205 stores metadata 243 in the metadata database 203.

Figure 3:
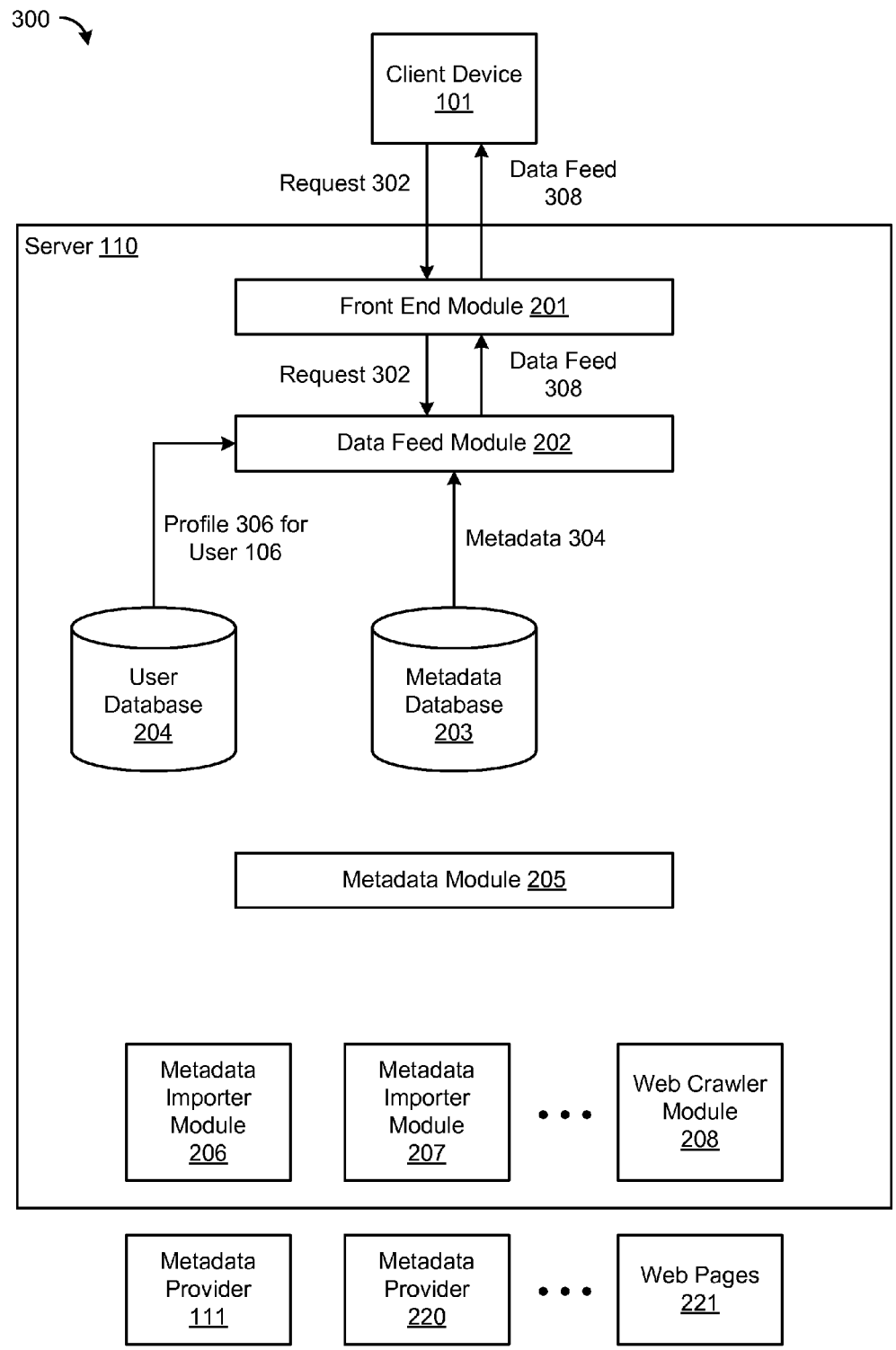
FIG. 3 is a block diagram illustrating a process for generating a data feed for a user, according to some implementations.

FIG. 3 is a block diagram 300 illustrating a process for generating a data feed for the user 106, according to some implementations. The data feed module 202 receives, via the front end module 201, a request 302 from the client device 101 of the user 106 to obtain a data feed for a set of video programs. In some implementations, the data feed is a personalized data feed for the user 106. In response to the request 302, the data feed module 202 obtains metadata 304 for video programs from the metadata database 203 and obtains a profile 306 for the user 106 from the user database 204. A respective profile for a respective user includes, but is not limited to, video programs that the respective user has previously accessed (e.g., viewed, recorded, rented, purchased, etc.), video programs in which the respective user has shown an interest (e.g., accessed information relating to video programs, information relating to the video programs that has been posted on a blog or social network, etc.), categories and/or genres of video programs in which the respective user is interested (e.g., obtained explicitly or through analysis of data and/or actions associated with the respective user), channels that the respective user has previously accessed, content providers to which the respective user has access, content sources to which the respective user has access, states (e.g., watched, not watched, etc.) of items in data feeds for the respective user, and/or video resolution preferences (e.g., 1080p, 720p, 480i, etc.) for the user. The data feed module 202 uses the profile 306 for the user 106 and the metadata 304 to generate a data feed 308 that is provided, via the front end module 201, to the client device 101. In some implementations, the data feed 308 is an RSS data feed. In some implementations, the data feed 308 is an Atom data feed. The data feed module is described in more detail below with reference to FIGS. 7-12.

Figure 4:
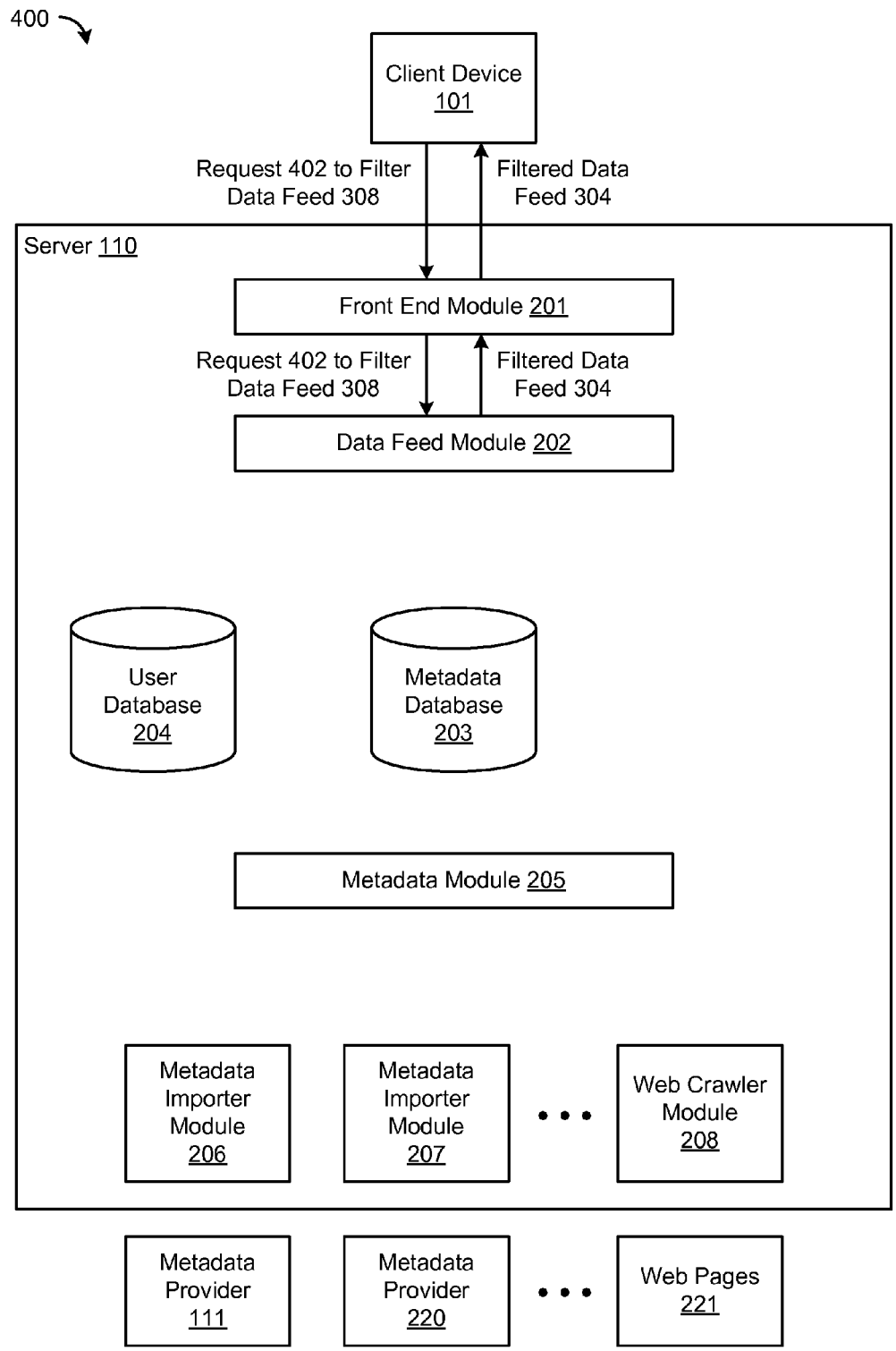
FIG. 4 is a block diagram illustrating a process for filtering a data feed for a user, according to some implementations.

FIG. 4 is a block diagram 400 illustrating a process for filtering a data feed for a user, according to some implementations. The data feed module 202 receives, from the client device 101 via the front end module 201, a request 402 to filter the data feed based on filtering criteria. The filtering criteria includes, but is not limited to, criteria that filters based on dates, times, channels, identifiers for series (e.g., names of the series), identifiers for episodes (e.g., names of episodes), directors, actors, genres, categories, identifiers for content providers, and/or identifiers for content sources. The data feed module 202 filters the data feed based on the filtering criteria to produce a filtered data feed 304 that is provided, via the front end module 201, to the client device 101.

Figure 5:
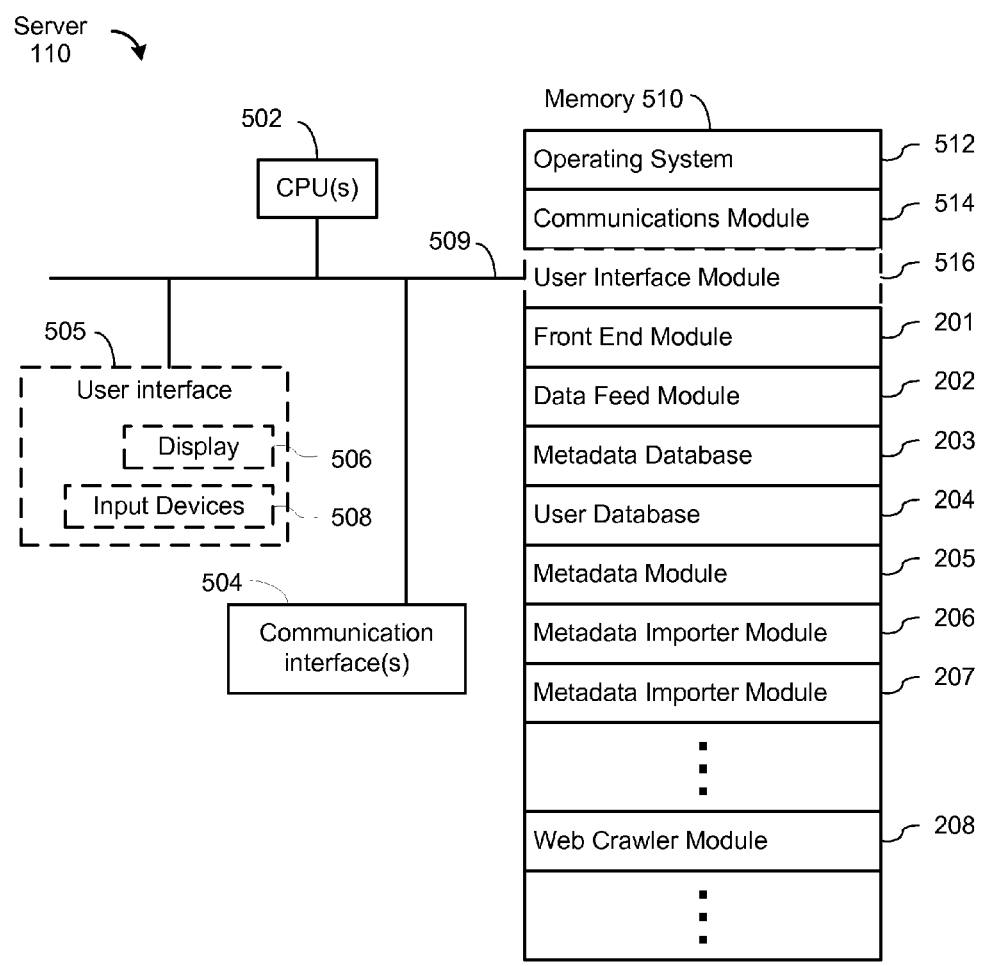
FIG. 5 is a block diagram illustrating a server, according to some implementations.

FIG. 5 is a block diagram illustrating the server 110, according to some implementations. The server 110 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The server 110 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some implementations, memory 510 or the computer readable storage medium of memory 510 stores the following programs, modules and data structures, or a subset thereof:
- an operating system 512 that includes procedures for handling various basic system services and for performing hardware dependent tasks;
- a communication module 514 that is used for connecting the server 110 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- the front end module 201, as described herein;
- the data feed module 202, as described herein;
- the metadata module 205, as described herein;
- the metadata importer modules 206-207, as described herein;
- the web crawler module 208, as described herein;
- the metadata database 203, as described herein; and
- the user database 204, as described herein.

In some implementations, the programs or modules identified above correspond to sets instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various implementations. In some implementations, memory 510 stores a subset of the modules and data structures identified above. Furthermore, memory 510 may store additional modules and data structures not described above.

Although FIG. 5 shows a "server," FIG. 5 is intended more as functional description of the various features which may be present in a set of servers than as a structural schematic of the implementations described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the server 110 and how features are allocated among them will vary from one implementation to another, and may depend in part on the amount of data traffic that the system must handle during peak usage periods as well as during average usage periods.

Figure 6:
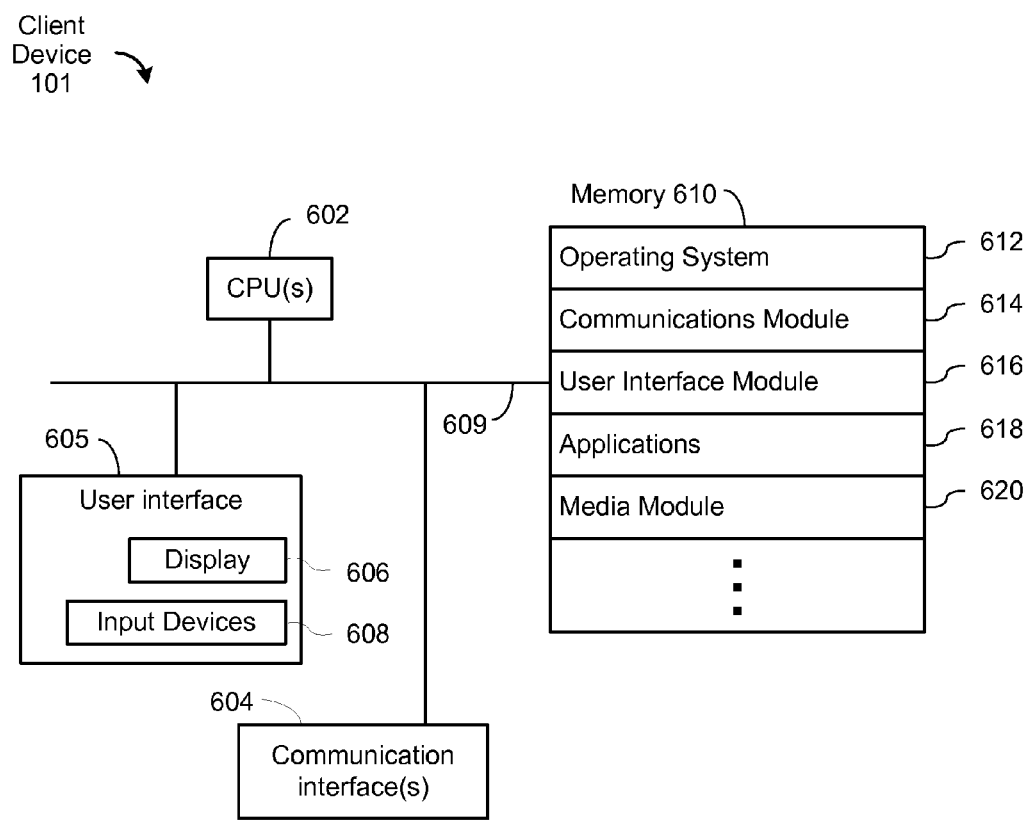
FIG. 6 is a block diagram illustrating a client device, according to some implementations.

FIG. 6 is a block diagram illustrating the client device 101, according to some implementations. The client device 101 typically includes one or more processing units (CPU's, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components. The client device 101 optionally includes a user interface 605 comprising a display device 606 (e.g., the output device 102) and input devices 608 (e.g., the input device 105). Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some implementations, memory 610 or the computer readable storage medium of memory 610 stores the following programs, modules and data structures, or a subset thereof:
- an operating system 612 that includes procedures for handling various basic system services and for performing hardware dependent tasks;
- a communication module 614 that is used for connecting the client device 101 to other computers via the one or more communication interfaces 604 (wired or wireless) and one or more communication networks, such as the Internet, other wide area networks, local area networks, metropolitan area networks, and so on;
- a user interface module 616 that receives commands from the user via the input devices 608 and generates user interface objects in a display device (e.g., the output device 102);
- applications 618 (e.g., a web browser, a television application, etc.); and
- a media module 620 that obtains and presents video programs (and/or other media items) on the output device 102.

In some implementations, the programs or modules identified above correspond to sets instructions for performing a function described above. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various implementations. In some implementations, memory 610 stores a subset of the modules and data structures identified above. Furthermore, memory 610 may store additional modules and data structures not described above.

Although FIG. 6 shows a "client device," FIG. 6 is intended more as functional description of the various features which may be present in a client device than as a structural schematic of the implementations described herein. In practice, and as recognized by those of ordinary skill in the art, items shown separately could be combined and some items could be separated.

Providing Data Feeds for Video Programs

Figure 7:
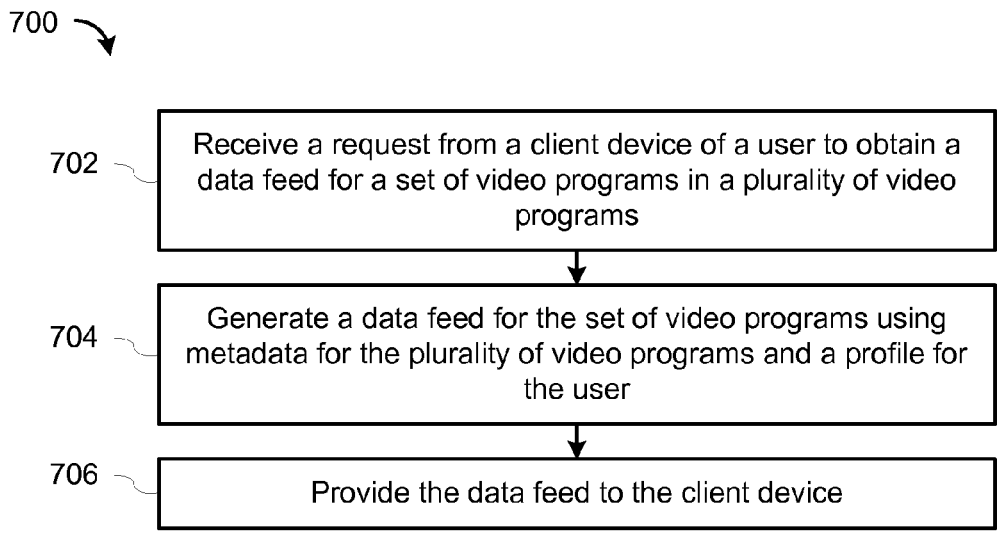
FIG. 7 is a flowchart of a method for providing data feeds for video programs, according to some implementations.

FIG. 7 is a flowchart of a method 700 for providing data feeds for video programs, according to some implementations. The data feed module 202 receives (702) a request (e.g., the request 302) from a client device (e.g., the client device 101) of a user (e.g., the user 106) to obtain a data feed for a set of video programs in a plurality of video programs, where the set of video programs includes video programs having at least one common attribute. In some implementations, the at least one common attribute is specified in the request received from the client device. In some implementations, the request is a link corresponding to the data feed, where the link includes the at least one common attribute. For example, the link may be a URL "http://www.example.com/nbc," where "http" is the scheme name, "www.example.com" is a domain name (or network address) associated with the server 110, and "nbc" (i.e., the path portion of the URL) is a common attribute for the video programs in the feed. In this example, the URL indicates that the feed includes video programs for the television network NBC. Other common attributes may include, but are not limited to, dates when the video programs are accessible, times when the video programs are accessible, channels on which the video programs are accessible, identifiers for series (e.g., names of the series), identifiers for episodes (e.g., names of episodes), directors, actors, genres, categories, identifiers for content providers, identifiers for content sources, and/or states of the video programs (e.g., new video programs, old/reruns of video programs, etc.). In some implementations, multiple common attributes may be included in the path portion of the URL. For example, the URL "http://www.example.com/nbc/tonight" is a data feed that includes programs for the television network NBC airing tonight. In another example, the URL "http://www.example.com/30 Rock/Season 1" is a data feed that includes programs for Season 1 of the television program "30 Rock."

In response to receiving the request, the data feed module 202 generates (704) a data feed for the set of video programs (e.g., the data feed 308) using metadata for the plurality of video programs (e.g., the metadata 304) and a profile for the user (e.g., the profile 306 for the user 106). In some implementations, a respective data item in the data feed corresponds to a respective video program in the set of video programs and includes at least one link to at least one content source from which the respective video program is available. In some implementations, a respective link includes a location of a video program on content source. For example, the respective link may be "http://www.example.com/episode2104.mp4," which indicates that the video file "episode2104.mp4" is located on a server for "www.example.com." In some implementations, the respective link is usable by the client device to perform a predetermined action with respect to a respective video program. For example, the respective link may be "tv://content_source/channel_id/program_id," where "content_source" is an identifier for a particular content source on which the television program is available (e.g., a cable television service), channel_id is an identifier for a particular channel on which the television program is available, and program_id is an identifier for the television program. The client device may use this respective link to access the television program by instructing a media device (e.g., the media device 103) to tune to the particular channel on the particular content source. Other actions may be performed with respect to the respective link. For example, the client device may record the television program if the television program is scheduled to air at a future date and/or time. Alternatively, the client device may play the television program if the television program is located on a streaming media source (or on a local content source). In some implementations, the data feed includes a data item corresponding to a first video program in the set of video programs, where the data item includes a first link to a first instance of the first video program that is available from a first content source and a second link to a second instance of the first video program that is available on a second content source, and where the first content source and the second content source are different types of content sources. For example, the data feed may include a data item that corresponds to a particular episode of a television program, where the data item include a first link to a streaming media service and a second link to a cable television channel. Operation 704 is described in more detail below with reference to FIG. 8.

In some implementations, the data items included in the data feed for the set of video programs are not generated until the request is received from the client device. In other words, the data feed and the data items of the data feed are dynamically generated in response to the request.

The data feed module 202 then provides (706) the data feed to the client device.

Figure 8:
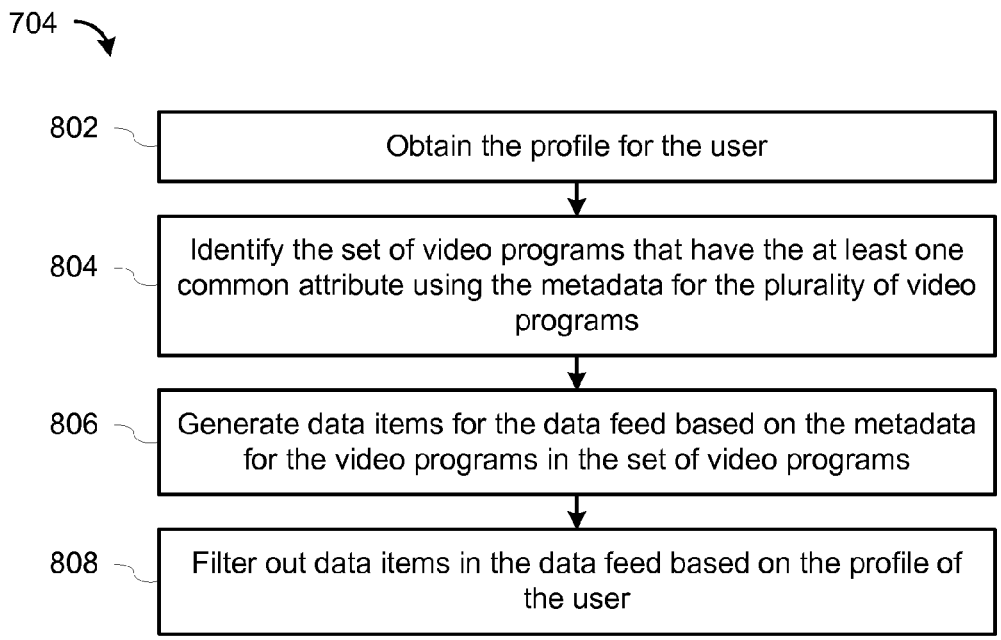
FIG. 8 is a flowchart of a method for generating a data feed for a set of video programs using metadata for video programs and a profile for a user, according to some implementations.

FIG. 8 is a flowchart of a method for generating (704) a data feed for a set of video programs using metadata for video programs and a profile for a user, according to some implementations. The data feed module 202 obtains (802) the profile for the user. The data feed module 202 then identifies (804) the set of video programs that have the at least one common attribute using the metadata for the plurality of video programs. For example, if the at least one common attribute is a particular television series the set of video programs include video programs in the particular television series. Note that multiple common attributes may be specified. For example, the common attributes may include a particular television series and a particular date range (or seasons) of the television series.

The data feed module 202 generates (806) data items for the data feed based on the metadata for the video programs in the set of video programs. Operation 808 is described in more detail below with reference to FIGS. 9 and 10.

The data feed module 202 then filters (808) out data items in the data feed based on the profile of the user. Continuing the example from above, the data feed module 202 may filter the data feed so that only unwatched episodes of the particular television series is included in the data feed. In another example, the data feed module may filter the data feed so that only episodes of the particular television series are available in 1080p resolution are included in the data feed. The use of the profile for the user allows the data feed module 202 to generate a customized data feed for the user.

Figure 9:
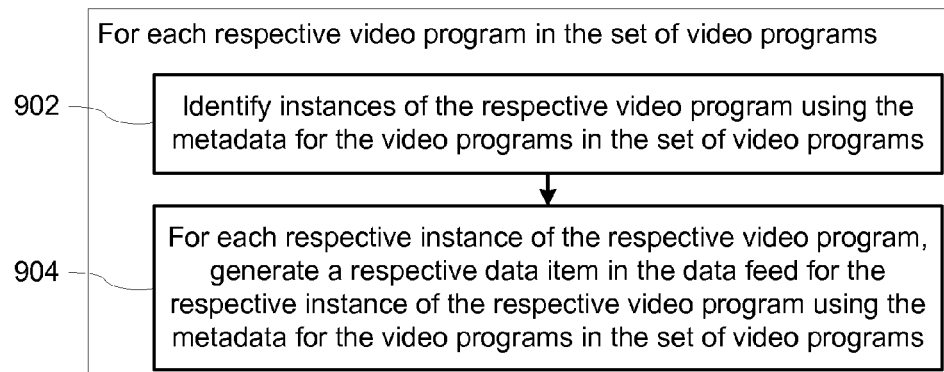
FIG. 9 is a flowchart of a method for generating data items for a data feed, according to some implementations.

FIG. 9 is a flowchart of a method for generating (806) data items for a data feed, according to some implementations. For each respective video program in the set of video programs, the data feed module 202 (1) identifies (902) instances of the respective video program using the metadata for the video programs in the set of video programs and (2) for each respective instance of the respective video program, the data feed module 202 generates (904) a respective data item in the data feed for the respective instance of the respective video program using the metadata for the video programs in the set of video programs. Thus, in these implementations, multiple data items corresponding to a video program are included in the data feed where each data item corresponds to an instance of the video program.

Figure 10:
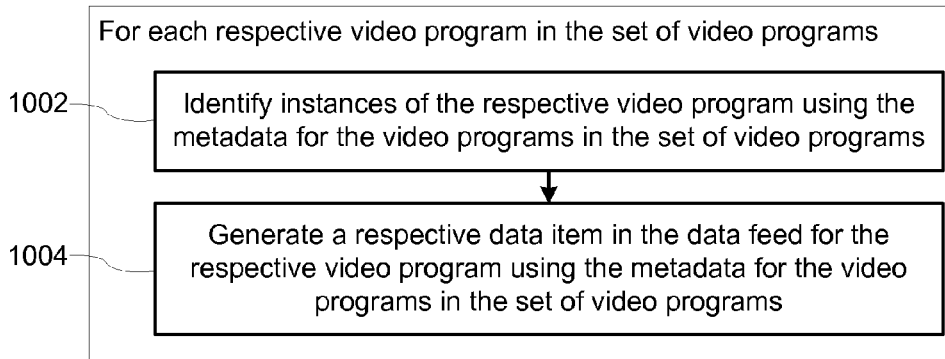
FIG. 10 is a flowchart of another method for generating data items for a data feed, according to some implementations.

FIG. 10 is a flowchart of another method for generating (806) data items for a data feed, according to some implementations. For each respective video program in the set of video programs, the data feed module 202 identifies (1002) instances of the respective video program using the metadata for the video programs in the set of video programs and generates (1004) a respective data item in the data feed for the respective video program using the metadata for the video programs in the set of video programs, where the respective data item for the respective video program includes a link to each instance of the respective video program. Thus, in these implementations, a single data item corresponding to a video program is included in the data feed where the single data item includes links to a plurality of instances of the video program.

Figure 11:
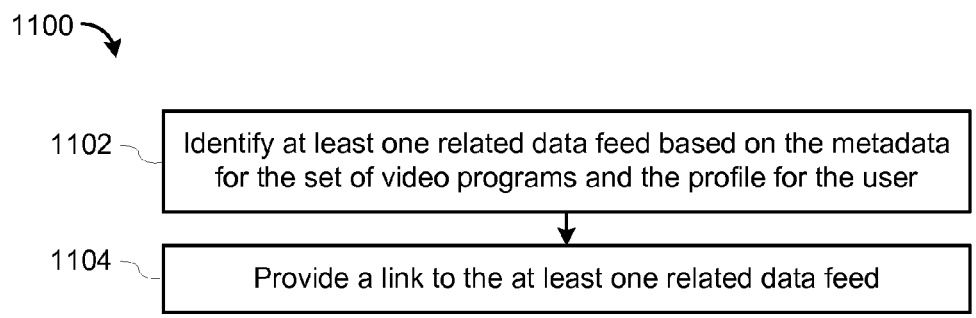
FIG. 11 is a flowchart of a method for identifying related data feeds, according to some implementations.

In some implementations, the data feed module provides information identifying related data feeds. For example, consider a data feed includes episodes of a television series. In this example, a related data feed may include a data feed that lists episodes of the television series that are available on a particular content source (e.g., a cable television channel). In another example, a related data feed may include a data feed that lists episodes of the television series in a particular season of the television series. In another example, a related data feed may include a data feed that lists episodes of television programs that are in a similar genre to a genre of the television series (e.g., a comedy). FIG. 11 is a flowchart of a method 1100 for identifying related data feeds, according to some implementations. The data feed module 202 identifies (1102) at least one related data feed based on the metadata for the set of video programs and the profile for the user and provides (1104) a link to the at least one related data feed.

Figure 12:
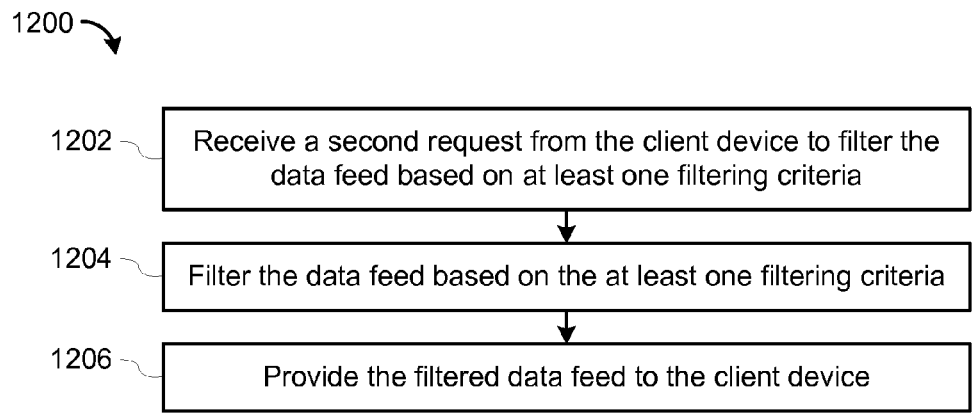
FIG. 12 is a flowchart of a method for filtering a data feed for a user based on filtering criteria, according to some implementations.

FIG. 12 is a flowchart of a method 1200 for filtering a data feed for a user based on filtering criteria, according to some implementations. The data feed module 202 receives (1202) a request (e.g., the request 402) from the client device to filter the data feed based on at least one filtering criteria (as described above). The data feed module 202 then filters (1204) the data feed based on the at least one filtering criteria and provides (1206) the filtered data feed (e.g., the filtered data feed 304) to the client device.

The methods illustrated in FIGS. 7-12 may be governed by instructions that are stored in a computer readable storage medium and that are executed by at least one processor of at least one server. Each of the operations shown in FIGS. 7-12 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for providing data feeds for video programs, performed on a server having at least one processor and memory storing at least one program for execution by the at least one processor, the method comprising:
 receiving a request from a client device of a user to obtain a data feed for a set of video programs in a plurality of video programs, the set of video programs including video programs having at least one common attribute;

in response to receiving the request, generating a data feed for the set of video programs using metadata for the plurality of video programs and a profile for the user, a respective data item in the data feed corresponding to a respective video program in the set of video programs and including at least one link to at least one content source from which the respective video program is available, wherein the data feed includes at least one data item corresponding to a first video program in the set of video programs, wherein the at least one data item includes a first link to a first instance of the first video program that is available from a first content source and a second link to a second instance of the first video program that is available on a second content source, and wherein the first content source and the second content source are different types of content sources; and providing the data feed to the client device.

2. The computer-implemented method of claim 1, wherein generating the data feed for the set of video programs using metadata for the plurality of video programs and the profile for the user includes:
obtaining the profile for the user;
identifying the set of video programs that have the at least one common attribute using the metadata for the plurality of video programs;
generating data items for the data feed based on the metadata for the video programs in the set of video programs; and
filtering out data items in the data feed based on the profile of the user.

3. The computer-implemented method of claim 2, wherein generating data items for the data feed based on the metadata for the video programs in the set of video programs includes:
for each respective video program in the set of video programs,
identifying instances of the respective video program using the metadata for the video programs in the set of video programs; and
for each respective instance of the respective video program, generating a respective data item in the data feed for the respective instance of the respective video program using the metadata for the video programs in the set of video programs.

4. The computer-implemented method of claim 2, wherein generating data items for the data feed based on the metadata for the video programs in the set of video programs includes:
for each respective video program in the set of video programs,
identifying instances of the respective video program using the metadata for the video programs in the set of video programs; and
generating a respective data item in the data feed for the respective video program using the metadata for the video programs in the set of video programs, wherein the respective data item for the respective video program includes a link to each instance of the respective video program.

5. The computer-implemented method of claim 1, further comprising:
identifying at least one related data feed based on the metadata for the set of video programs and the profile for the user; and
providing a link to the at least one related data feed.

6. The computer-implemented method of claim 1, further comprising:
receiving a second request from the client device to filter the data feed based on at least one filtering criteria;
filtering the data feed based on the at least one filtering criteria, wherein the filtering criteria include criteria that filters based on one or more of: dates, times, channels, identifiers for series, identifiers for episodes, directors, actors, identifiers for content providers, and identifiers for content sources; and
providing the filtered data feed to the client device.

7. The computer-implemented method of claim 1, wherein the at least one common attribute is specified in the request received from the client device.

8. The computer-implemented method of claim 1, wherein the request is a link corresponding to the data feed, and wherein the link includes the at least one common attribute.

9. The computer-implemented method of claim 1, wherein the at least one link is usable by the client device to perform a predetermined action with respect to the respective video program.

10. The computer-implemented method of claim 1, wherein the data items included in the data feed for the set of video programs are not generated until the request is received from the client device.

11. The computer-implemented method of claim 1, wherein the request is a URL corresponding to the data feed, wherein the URL includes a domain name of the server and at least one common attribute that is included in the path portion of the URL.

12. The computer-implemented method of claim 1, wherein the data feed is an RSS data feed.

13. The computer-implemented method of claim 1, wherein the data feed is an Atom data feed.

14. The computer-implemented method of claim 1, wherein the profile for the user includes video programs that the user has previously accessed.

15. The computer-implemented method of claim 1, wherein the profile for the user includes video programs in which the user has shown an interest.

16. The computer-implemented method of claim 1, wherein the profile for the user includes categories of video programs in which the user is interested.

17. The computer-implemented method of claim 1, wherein the profile for the user includes channels that the user has previously accessed.

18. The computer-implemented method of claim 1, wherein the profile for the user includes content sources to which the user has access, wherein the content sources include at least one local content source, wherein the at least one local content source is selected from a group consisting of: a digital video recorder, a hard disk drive, and a network storage device.

19. The computer-implemented method of claim 1, wherein the profile for the user includes states of items in data feeds for the user.

20. The computer-implemented method of claim 2, wherein the profile for the user includes video resolution preferences for the user; and
filtering out data items in the data feed based on the profile of the user comprises filtering out data items in the data feed based on the video resolution preferences for the user.

21. A system to provide data feeds for video programs, comprising:
at least one processor;
memory; and
at least one program stored in the memory and executable by the at least one processor, the at least one program comprising instructions to:

receive a request from a client device of a user to obtain a data feed for a set of video programs in a plurality of video programs, the set of video programs including video programs having at least one common attribute;

in response to receiving the request, generate a data feed for the set of video programs using metadata for the plurality of video programs and a profile for the user, a respective data item in the data feed corresponding to a respective video program in the set of video programs and including at least one link to at least one content source from which the respective video program is available, wherein the data feed includes at least one data item corresponding to a first video program in the set of video programs, wherein the at least one data item includes a first link to a first instance of the first video program that is available from a first content source and a second link to a second instance of the first video program that is available on a second content source, and wherein the first content source and the second content source are different types of content sources; and provide the data feed to the client device.

22. A non-transitory computer readable storage medium storing at least one program configured for execution by at least one processor of a computer system, the at least one program comprising instructions to:

receive a request from a client device of a user to obtain a data feed for a set of video programs in a plurality of video programs, the set of video programs including video programs having at least one common attribute;

in response to receiving the request, generate a data feed for the set of video programs using metadata for the plurality of video programs and a profile for the user, a respective data item in the data feed corresponding to a respective video program in the set of video programs and including at least one link to at least one content source from which the respective video program is available, wherein the data feed includes at least one data item corresponding to a first video program in the set of video programs, wherein the at least one data item includes a first link to a first instance of the first video program that is available from a first content source and a second link to a second instance of the first video program that is available on a second content source, and wherein the first content source and the second content source are different types of content sources; and provide the data feed to the client device.

23. The method of claim 1, wherein the data feed includes at least one data item corresponding to a second video program in the set of video programs, wherein the at least one data item corresponding to the second video program includes a first link to a first instance of the second video program that is available at a first time and a second link to a second instance of the second video program that is available at a second time, and wherein the first time and the second time are different times.

* * * * *